(12) United States Patent
Inoguchi

(10) Patent No.: US 7,549,775 B2
(45) Date of Patent: Jun. 23, 2009

(54) LIGHT SOURCE APPARATUS AND IMAGE DISPLAY APPARATUS HAVING SAME

(75) Inventor: Kazutaka Inoguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 144 days.

(21) Appl. No.: 11/749,966

(22) Filed: May 17, 2007

(65) Prior Publication Data

US 2007/0285628 A1    Dec. 13, 2007

(30) Foreign Application Priority Data

May 26, 2006    (JP)    .............................. 2006-146436

(51) Int. Cl.
*F21V 5/00*    (2006.01)

(52) U.S. Cl. .............................. 362/328; 345/7; 345/8; 345/9; 359/630; 359/631; 359/633; 359/636; 362/545; 362/327; 362/559

(58) Field of Classification Search ................. 359/630, 359/631, 634, 636, 290, 291, 292; 345/7, 345/8, 9; 362/545, 327, 328
See application file for complete search history.

(56) References Cited

U.S. PATENT DOCUMENTS

| | | | | |
|---|---|---|---|---|
| 4,729,076 | A | * | 3/1988 | Masami et al. .............. 362/235 |
| 5,785,418 | A | * | 7/1998 | Hochstein .................... 362/373 |
| 5,808,800 | A | * | 9/1998 | Handschy et al. ........... 359/630 |
| 6,335,838 | B1 | * | 1/2002 | Kasai et al. ................. 359/834 |
| 6,445,507 | B2 | * | 9/2002 | Togino et al. ............... 359/637 |
| 6,480,337 | B2 | | 11/2002 | Inoguchi et al. |
| 6,724,354 | B1 | * | 4/2004 | Spitzer et al. ................. 345/32 |
| 6,814,442 | B2 | * | 11/2004 | Okuyama et al. ............. 353/20 |
| 6,864,861 | B2 | * | 3/2005 | Schehrer et al. ................. 345/7 |
| 7,019,909 | B2 | | 3/2006 | Yamazaki et al. |
| 7,021,770 | B2 | | 4/2006 | Konno et al. |
| 7,095,562 | B1 | * | 8/2006 | Peng et al. ................... 359/630 |
| 7,136,228 | B2 | * | 11/2006 | Tanijiri et al. ............... 359/631 |
| 7,405,881 | B2 | * | 7/2008 | Shimizu et al. ............. 359/630 |
| 2007/0253183 | A1 | * | 11/2007 | Ishino et al. .................. 362/27 |

FOREIGN PATENT DOCUMENTS

| | | |
|---|---|---|
| JP | 07-333551 | 12/1995 |
| JP | 2000-057832 | 2/2000 |
| JP | 2002-072901 | * 12/2002 |
| JP | 2003-140110 | 5/2003 |
| JP | 2006-122530 | * 4/2006 |

* cited by examiner

*Primary Examiner*—Jacob Y Choi
(74) *Attorney, Agent, or Firm*—Rossi, Kimms & McDowell, LLP

(57) ABSTRACT

Directivity of light beams can be adjusted appropriately relative to the normal to the light emission surface of a light source. Thus, the light source apparatus has high brightness without significant unevenness in illumination with its simple structure. The light source apparatus comprises a light source substrate on which plural light sources are arranged, a secondary light source member on which a secondary light source surface is formed when it receives light from the plural light sources, and frame that supports the light source substrate and the secondary light source member from their lateral sides so that they are opposed to each other. At least a pair of side surfaces of the frame has reflection surfaces opposed along the arrangement direction of the plural light sources, and the reflection surfaces that the pair of side surfaces has are inclined to the same direction relative to the light source substrate.

2 Claims, 14 Drawing Sheets

LIGHT SOURCE APPARATUS AND IMAGE DISPLAY APPARATUS HAVING SAME

BACKGROUND OF THE INVENTION

1. Field of the Invention

The present invention relates to a light source apparatus and an image display apparatus having the same, more particularly to a light source apparatus that is suitably used in an apparatus such as a projector or a head mount display that enlarges for viewing, through an optical system, an image formed by light beams optically modulated by a liquid crystal display element.

2. Description of the Related Art

There has been known a light source apparatus that creates, using light beams from a primary light source, a secondary light source surface on a diffusion surface and illuminates a liquid crystal display element with light beams from the secondary light source surface directly or via an illumination optical system.

A light source that uses as a light source a fluorescent lamp or a plurality of light emitting diodes (LED) arranged on a substrate has been known (see Japanese Patent Application Laid-Open No. 2003-140110).

There have been known a liquid crystal projector and a head mounted display (HMD) that illuminate an image display element such as a liquid crystal display element with light beams from a light source of the aforementioned type and enlarges an image displayed on the image display element through an optical system to present an enlarged image to an observer.

There has also been known a projector that uses a light source apparatus of the aforementioned type and a decentered free-form surface optical system to project an image from an oblique direction (see U.S. Pat. No. 7,021,770).

In a known observation optical system, an optical system having a decentered free-form curved surface is used to make the overall size of the apparatus small while enhancing the realism of the image by making the angle of view wide (see Japanese Patent Application Laid-Open No. H07-333551 and U.S. Pat. No. 7,019,909).

There has also been known an image observation apparatus that uses a reflection type liquid crystal display element having a high aperture ratio as a small, high-definition display panel and forms an image through optically modulation by the liquid crystal display element to present it for observation (see U.S. Pat. No. 6,480,337).

In the image observation apparatus such as the HMD, it is preferred that the light source apparatus be designed to have directivity in illuminating a liquid crystal display element with light beams from a secondary light source surface so that the direction in which the brightness is maximum is not the direction normal to the secondary light source surface but the direction of the center field angle chief ray. Here, the center field angle chief ray refers to the chief ray emerging from the center of the image displayed on the liquid crystal display element and incident on the center of the exit pupil of the optical system.

A light source apparatus having directivity toward a direction other than the direction normal to the light source is also known (see Japanese Patent Application Laid-Open No. 2000-057832). Japanese Patent Application Laid-Open No. 2000-057832 teaches to arrange a plurality of light sources each of which is covered with a reflector, and cover spaces between the reflectors with reflection plates so that light emerging from the reflectors and light reflected by a transmission type liquid crystal display element and then reflected by the reflection plates of the light source apparatus serve as illumination light.

To present a good image in a liquid crystal projector that uses a liquid crystal display element, it is important to illuminate the liquid crystal display element uniformly and efficiently with light beams emitted from a light source apparatus. In the liquid crystal projector using a reflection type liquid crystal display element, the structure of the light source apparatus for illuminating the liquid crystal display element is generally complex, illuminance on the liquid crystal display element is likely to be uneven, and it is very difficult to illuminate the liquid crystal element efficiently at a high luminance. In illuminating, in particular, a reflection type liquid crystal display element, it is important to appropriately arrange the directivity of light beams emitted from the light source apparatus.

There have been no conventional light source apparatuses in which directivity of light beams emitted from a light source apparatus is appropriately arranged by a simple structure in illuminating a liquid crystal display element.

SUMMARY OF THE INVENTION

The light source apparatus according to the present invention has a light source substrate on which a plurality of light sources is arranged, a secondary light source member on which a secondary light source surface is formed when it receives light from the plurality of light sources, and a frame that supports the light source substrate and the secondary light source member from their lateral sides so that the light source substrate and the secondary light source member are opposed to each other, wherein at least one pair of side surfaces of the frame that are opposed to each other along the arrangement direction of the plurality of light sources has reflection surfaces, and the reflection surfaces that the pair of side surfaces has are inclined to the same direction relative to the light source substrate.

Further features of the present invention will become apparent from the following description of exemplary embodiments with reference to the attached drawings.

DESCRIPTION OF THE EMBODIMENTS

In the following, embodiments of the present invention will be described with reference to the accompanying drawings.

First Embodiment

Figure 1:
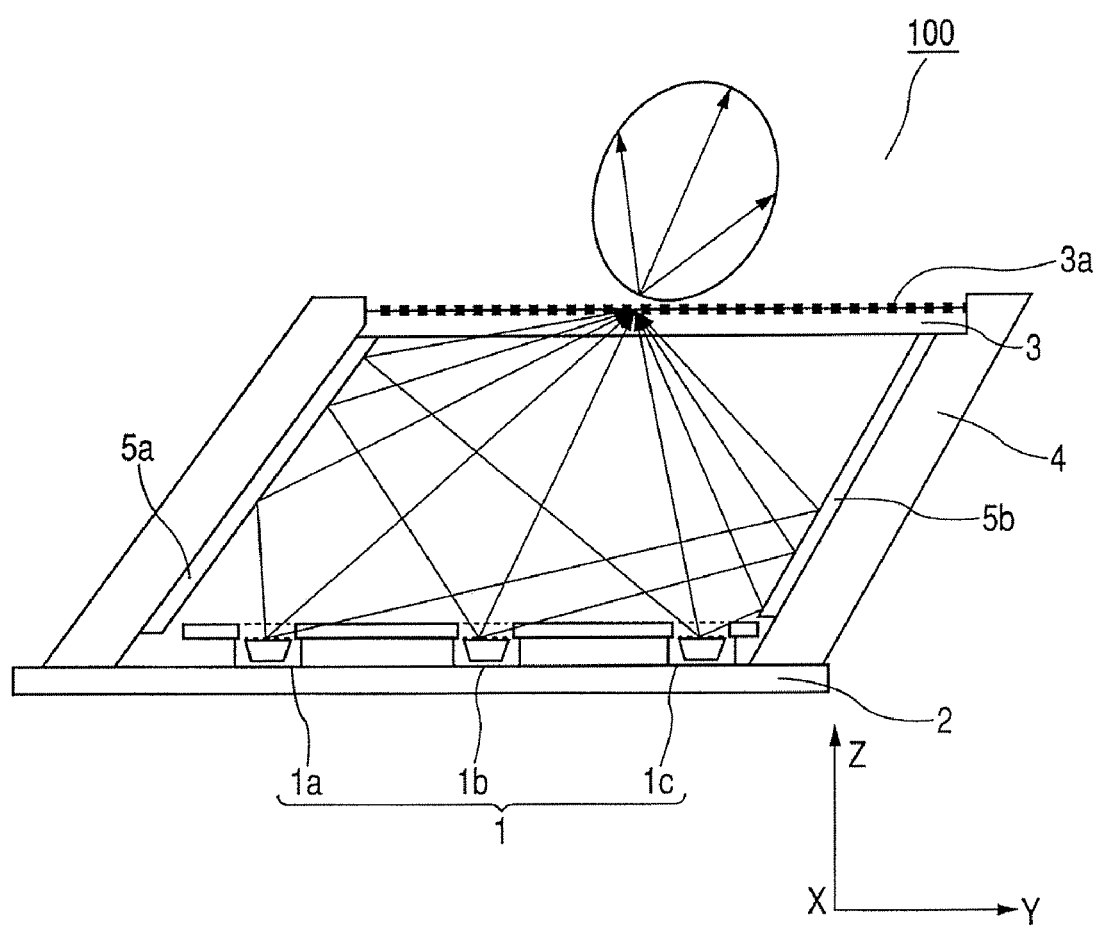
FIG. 1 schematic illustration of a cross section of the relevant portions of a light source apparatus according to a first embodiment.

FIG. 1 is a cross sectional side view schematically illustrating the structure of a light source apparatus according to a first embodiment of the present invention. The light source apparatus 100 illustrated in FIG. 1 has a primary light source portion 1 including a plurality of light sources (or LEDs) 1a, 1b, 1c and so on. The LEDs are arranged one-dimensionally or two-dimensionally. The LEDs are arranged on a light source substrate (or LED substrate) 2. The light source apparatus 100 also has a diffusion plate (or secondary light source member) 3 that constitutes a light emission surface (i.e. secondary light source surface) 3a of the light source apparatus. The light source substrate 2 and the diffusion plate 3 are held by a frame 4. Portions of inside of the frame 4 are covered with reflection plates 5 (5a, 5b).

The frame 4 is adapted to support the light source substrate 2 and the diffusion plate 3 from their lateral sides so that the surface on which the plurality of light sources 1a, 1b, 1c is arranged and the secondary light source surface 3a of the diffusion plate 3 are opposed in parallel or nearly parallel (within the angle range of ±10 degrees) to each other.

The frame 4 is configured in such a way that the reflection plates 5a, 5b provided on the inner sides thereof are inclined to one direction in a cross section (i.e. in the plane of the drawing sheet of FIG. 1). In other words, the reflection plates 5a, 5b provided on the sides of the frame 4 that are opposed to each other with respect to the direction along which the plurality of light sources is arranged are inclined in the same direction relative to the light source substrate 2.

In the light source apparatus 100 having the above described structure according to this embodiment, a secondary light source surface 3a is formed on the diffusion plate 3 in the perpendicular direction (z direction) of the plurality of light sources 1a, 1b, 1c.

Thus, there is provided a very bright light source that is relatively short in the perpendicular direction and has directivity in a direction other than the directly front direction of the light source portion 1.

As will be described later, the light source apparatus 100 is used in combination with an optical system having a plurality of decentered reflective curved surfaces that directs light emitted from image display means toward an observer, to provide an image display apparatus that enables the observer to observe the brightest image.

FIGS. 2A to 11 are diagrams illustrating optical paths of illumination light beams in the light source apparatus according to the present invention. These drawings illustrate only the relevant portions in a simplified manner. For example, LEDs 1 are regarded as point light sources. The light sources (LEDs) 1 are point light sources and emit light in the positive Z direction in such a way as to constitute a Lambertian source.

A local Z axis for the light source is defined by an axis parallel to the z axis or orthogonal to the light source substrate 2. The Lambertian source is defined as a light source whose light intensity $I(\theta)$ in the direction that forms angle $\theta$ relative to the local z axis is represented by $I(\theta)=I0\times\cos(\theta)$, where $I0$ is the light intensity in the direction of the local z axis.

In this embodiment, the light sources 1 include the first, second and third light sources 1a, 1b, 1c arranged at equal intervals.

In the following, how light beams emitted from each of the light sources 1a, 1b, 1c are incident on points a, b, c on the diffusion plate 3 in this embodiment will be described.

Figure 2A:
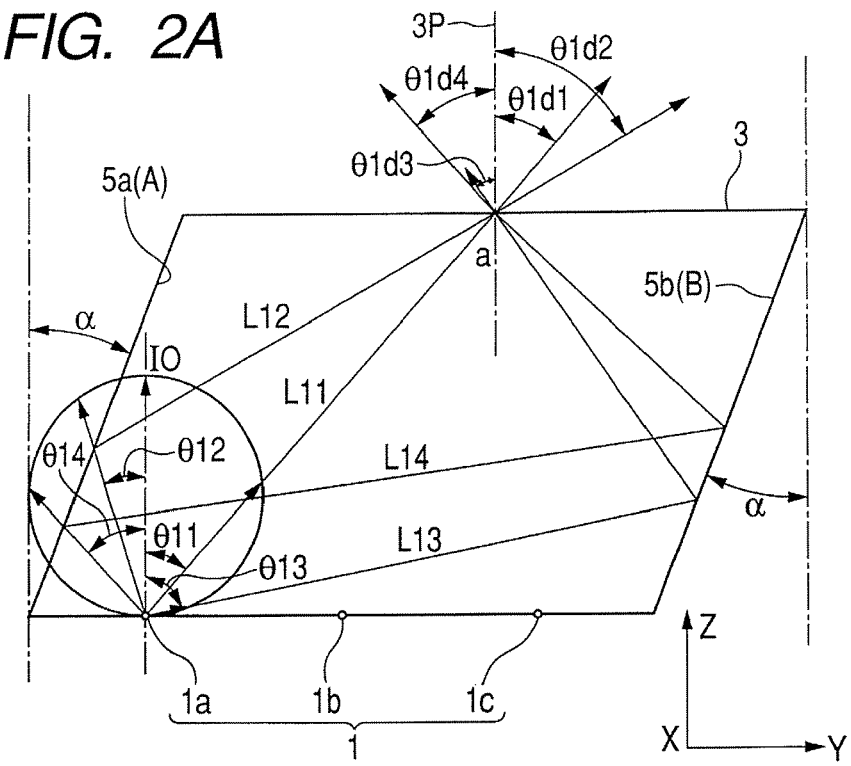
FIGS. 2A and 2B illustrate optical paths of light beams that are emitted from one light source and incident on a point on a diffusion plate.
Figure 2B:
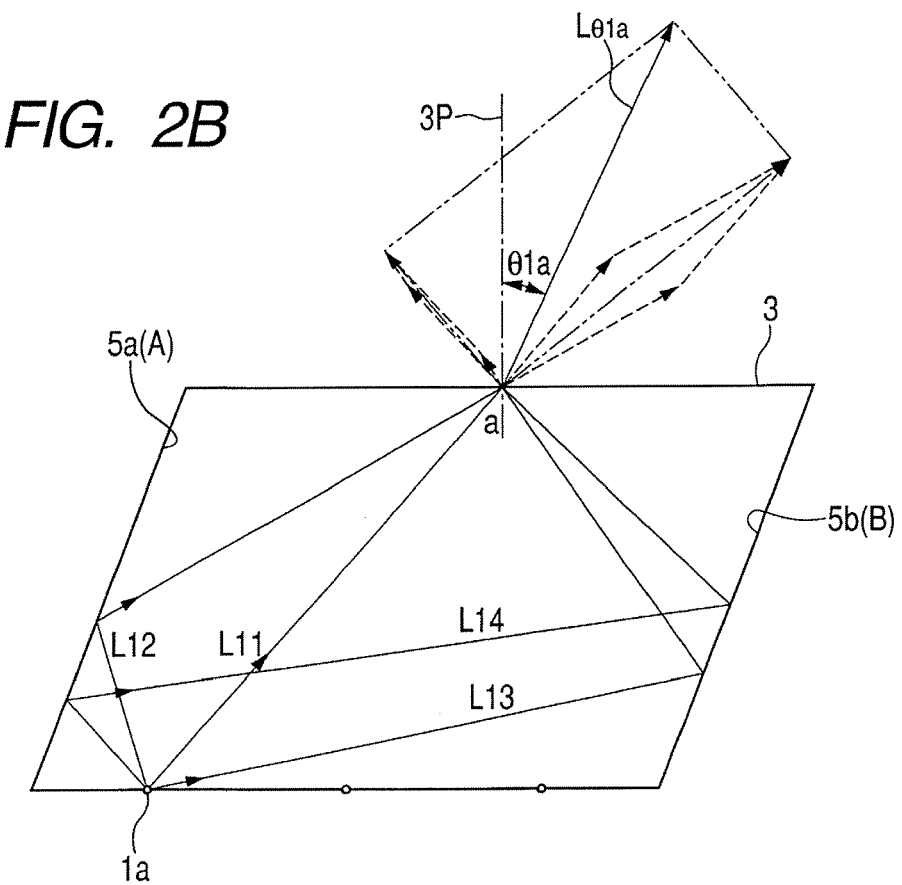

FIGS. 2A and 2B illustrate optical paths of light beams that are emitted from the first light source 1a and reach the center a of the diffusion plate 3.

In FIGS. 2A and 2B, there are four beams that are emitted from the light source 1a and incident on the center a of the diffusion plate 3. The four beams include light beam L11 that reaches the center a of the diffusion plate 3 directly from the light source 1a, light beam L12 that reaches the center a of the diffusion plate 3 after reflected by one side A (reflection plate 5a), light beam L13 that reaches the center a of the diffusion plate 3 after reflected by another side B (reflection plate 5b), and light beam L14 that reaches the center a of the diffusion plate 3 after reflected by side A and side B.

FIG. 2A shows the emission intensities and optical paths of light beams that are emitted from the first light source 1a and reach the center a of the diffusion plate 3. Here, absorption and reflection of light on the diffusion plate 3 and absorption of light on the wall surfaces A, B are ignored. Beam L11 has an intensity of $I0\times\cos(\theta 11)$ and is incident on the center a of the diffusion plate 3 at angle $\theta 1d1$ $(=\theta 11)$ relative to the normal 3P to the diffusion plate 3.

Light beam L12 is emitted with an intensity of $I0\times\cos(\theta 12)$ and is incident on the center a of the diffusion plate 3 at angle $\theta 1d2$ $(=\theta 12+2\times\alpha)$ relative to the normal 3P to the diffusion plate 3.

Light beam L13 is emitted with an intensity of $I0\times\cos(\theta 13)$ and is incident on the center a of the diffusion plate 3 at angle $\theta 1d3$ $(=\pi/2-\theta 13)$ relative to the normal 3P to the diffusion plate 3. Light beam L14 is emitted with an intensity of $I0\times\cos(\theta 14)$ and is incident on the center a of the diffusion plate 3 at angle $\theta 1d4$ relative to the normal 3P to the diffusion plate 3.

FIG. 2B shows the intensities of the light beams that are emitted from the first light source 1a and reach the center a of the diffusion plate 3 with the reflectance of the reflective side surfaces A, B being taken into account and the direction of the light combined by the light beams.

Here, ignoring angle dependency of the reflectance of the reflective side surfaces A, B, the reflective side surfaces A, B are assumed to have a uniform reflectance R. Under this assumption, the intensity of light beam L11 is still $I0\times\cos(\theta 11)$. The intensity of light beam L12 reflected by side surface A is $R\times I0\times\cos(\theta 12)$. The intensity of light beam L13 reflected by side surface B is $R \times I0 \times \cos(\theta 13)$. The intensity of light beam L14 reflected by side surface A and side surface B is $R^2 \times I0 \times \cos(\theta 14)$. These light beams reach the center a of the diffusion plate 3. In the diagram of FIG. 2B, it is assumed that the reflectance R is nearly equal to 90%.

Combining the intensities of the light beams, light $L_{\theta 1}a$ that is oriented to a direction at angle $\theta 1a$ as shown in FIG. 2B is obtained. Thus, the light incident on the center a of the diffusion plate 3 by contributions of light beams emitted from the first light source 1a has the highest directivity in the direction at angle $\theta 1a$ relative to the normal 3P to the diffusion plate.

For example, in the case where the diffusion plate 3 has perfect diffusion characteristics, the above described situation is the case. Actually, light components that generate combined light have been diffused according to diffusion characteristics of the diffusion plate 3. When the diffusion plate 3 has somewhat high diffusivity, the contribution to the directivity of light that has passed through the diffusion plate 3 is similar to that shown in FIG. 2B.

Therefore, it is desirable that the diffusion plate 3 used have diffusivity of at least 30°±5° in the full width at half maximum. It is more desirable that the diffusion plate 3 have diffusivity larger than 30°, more particularly approximately 60° in the full width at half maximum.

In the following, contributions of light beams emitted from the first light source 1a at point b that is located on the left (i.e. −y side) of the center a of the diffusion plate 3 will be discussed with reference to FIG. 3.

Figure 3:
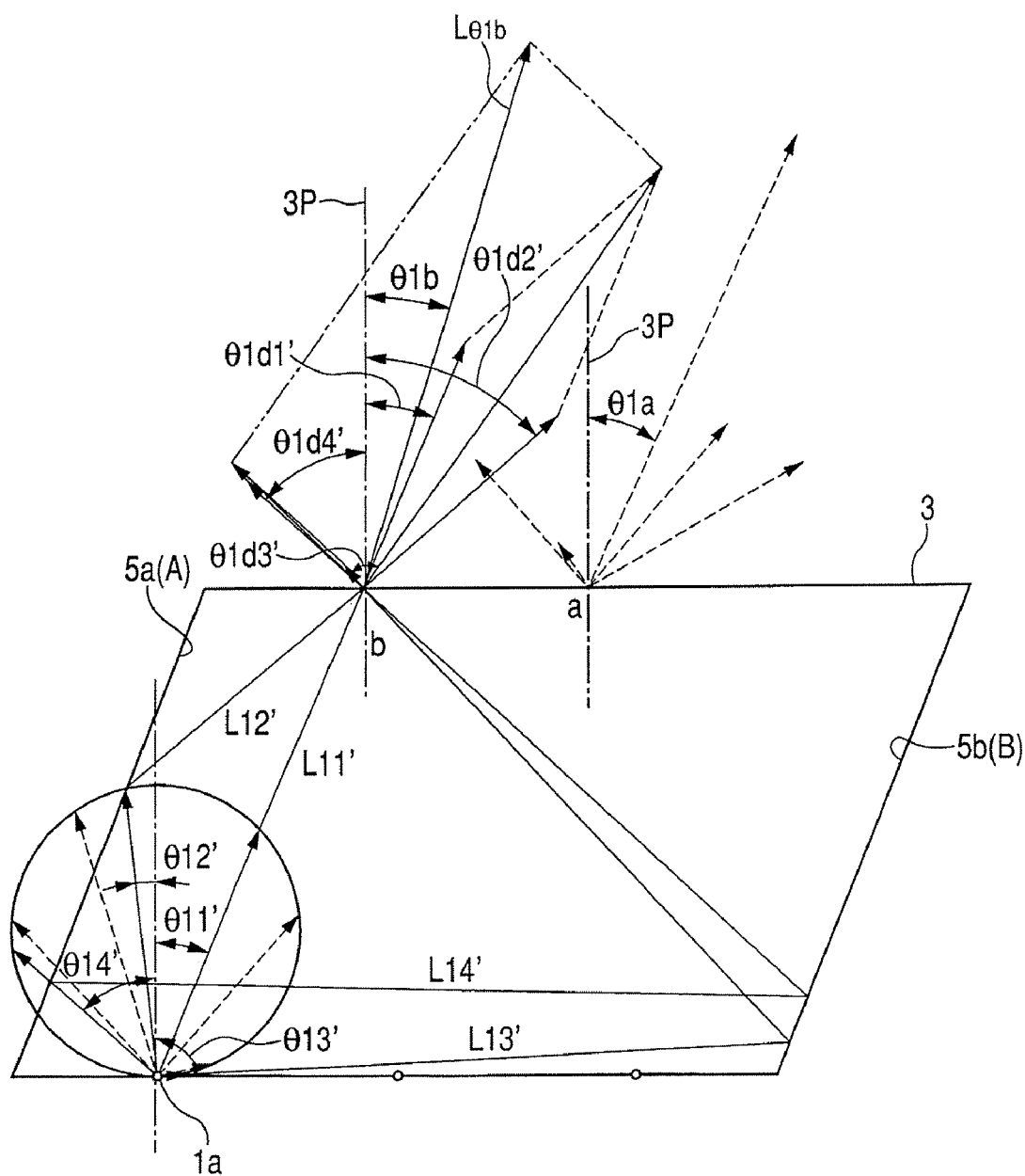
FIG. 3 illustrates optical paths of light beams that are emitted from one light source and incident on a point on the diffusion plate.

In FIG. 3, light beam L11' having an intensity of $I0 \times \cos(\theta 11')$ reaches point b on the diffusion plate 3 at angle $\theta 1d1'$ relative to the normal 3P to the diffusion plate. Light beam L12' is emitted with an intensity of $I0 \times \cos(\theta 12')$ and reflected by side surface A, whereby its intensity is reduced to $R \times I0 \times \cos(\theta 12')$. Thus, light beam L12' having an intensity of $R \times I0 \times \cos(\theta 12')$ reaches point b of the diffusion plate 3 at angle $\theta 1d2'$ (=$\theta 12'+2 \times \alpha$) relative to the normal 3P to the diffusion plate.

Light beam L13' is emitted with an intensity of $I0 \times \cos(\theta 13')$ and reflected by side surface B, whereby its intensity is reduced to $R \times I0 \times \cos(\theta 13')$. Thus, light beam L13' having an intensity of $R \times I0 \times \cos(\theta 13')$ reaches point b of the diffusion plate 3 at angle $\theta 1d3'$ relative to the normal 3P to the diffusion plate. Light beam L14' is emitted with an intensity of $I0 \times \cos(\theta 14')$ and reflected by side surface A and then side surface B, whereby its intensity is reduced to $R^2 \times I0 \times \cos(\theta 14')$. Thus, light beam L14' having an intensity of $R^2 \times I0 \times \cos(\theta 14')$ reaches point b of the diffusion plate 3 at angle $\theta 1d4'$ (=$\theta 14'$) relative to the normal 3P to the diffusion plate.

Combining these light beams, light $L_{\theta 1}b$ directed to a direction at angle $\theta 1b$ is obtained. Thus, the light passing through point b of the diffusion plate 3 generated by contributions of light beams emitted from the first light source 1a has the highest directivity in the direction at angle $\theta 1b$ relative to the normal 3P to the diffusion plate 3.

As to light beam L11' inclined to the right relative to the normal 3P to the diffusion plate 3, $\theta 1d1'<\theta 1d1$ and $I0 \times \cos(\theta 11')>I0 \times \cos(\theta 11)$. Thus, the contribution of direct light beam L11' is smaller in terms of angle but higher in terms of intensity as compared to the contribution of light beam 11 at the center a.

Similarly, as to light beam L12' inclined to the right relative to the normal 3P to the diffusion plate 3, $\theta 1d2'<\theta 1d2$ and $I0 \times \cos(\theta 12')>I0 \times \cos(\theta 12)$. Thus, the contribution of light beam L12' is smaller in terms of angle but higher in terms of intensity as compared to the contribution of light beam 12 at the center a.

On the other hand, as to light beam L13' inclined to the left relative to the normal 3P to the diffusion plate 3, $\theta 1d3' \geq \theta 1d3$ and $I0 \times \cos(\theta 13')<I0 \times \cos(\theta 13)$. Thus, the contribution of light beam L13' is larger in terms of angle but lower in terms of intensity as compared to the contribution of light beam 13 at the center a.

Similarly, as to light beam L14' inclined to the left relative to the normal 3P to the diffusion plate 3, $\theta 1d4' \geq \theta 1d4$ and $I0 \times \cos(\theta 14')<I0 \times \cos(\theta 14)$. Thus, the contribution of light beam L14' is larger in terms of angle but lower in terms of intensity as compared to the contribution of light beam 14 at the center a.

Considering the light $L_{\theta 1}b$ which is obtained by the combination of the above light beams, there are only small differences in the angle $L_{\theta 1}b$, $\theta 1a$ and the intensity between combined light $L_{\theta 1}b$ and combined light $L_{\theta 1}a$.

In the following, contributions of light beams emitted from the first light source 1a at point c that is located on the right (i.e. +y side) of the center a of the diffusion plate 3 will be discussed with reference to FIG. 4.

Figure 4:
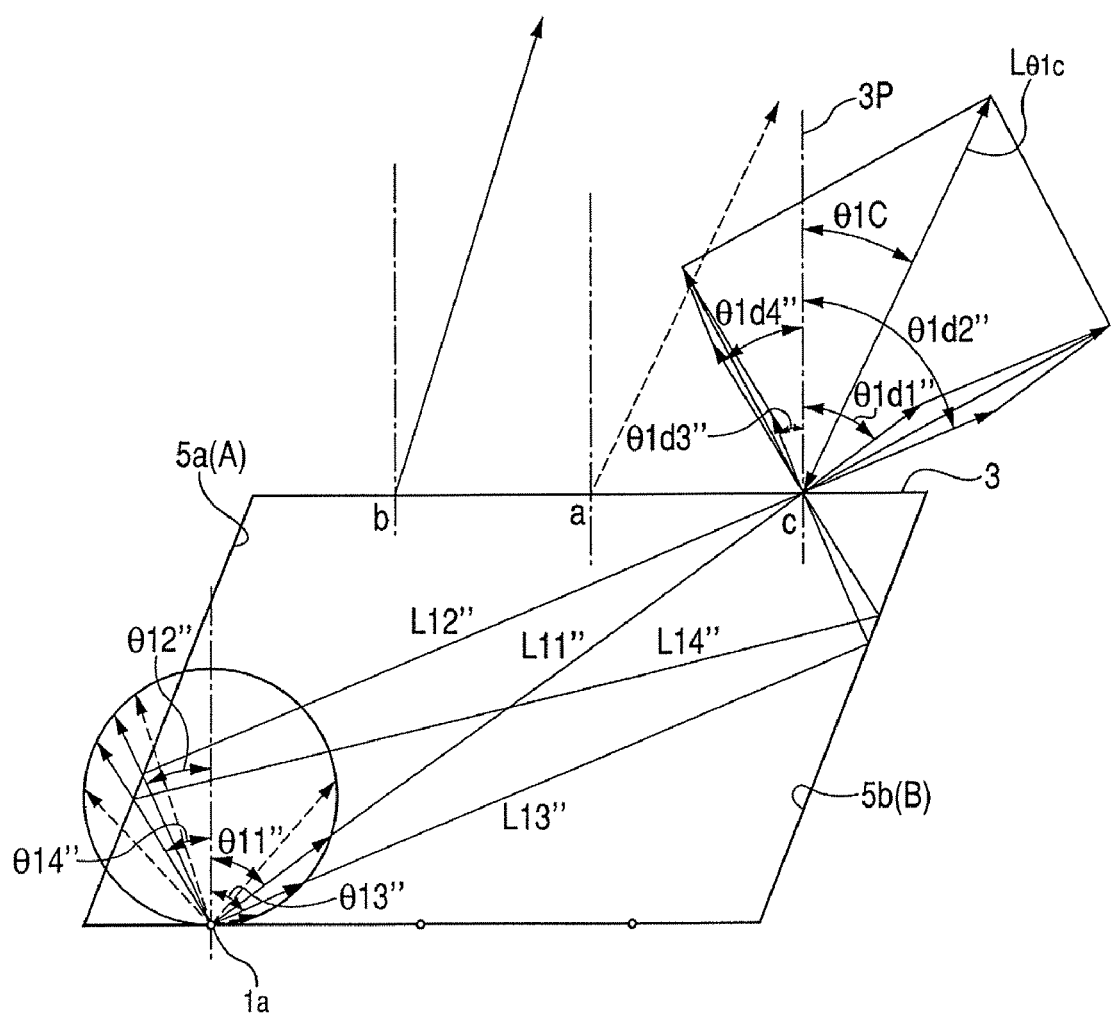
FIG. 4 illustrates optical paths of light beams that are emitted from one light source and incident on a point on the diffusion plate.

In FIG. 4, light beam L11" having an intensity of $I0 \times \cos(\theta 11")$ reaches point c of the diffusion plate 3 at angle $\theta 1d1"$ relative to the normal 3P to the diffusion plate. Light beam L12" is emitted with an intensity of $I0 \times \cos(\theta 12")$ and reflected by side surface A, whereby its intensity is reduced to $R \times I0 \times \cos(\theta 12")$. Thus, light beam L12" having an intensity of $R \times I0 \times \cos(\theta 12")$ reaches point c of the diffusion plate 3 at angle $\theta 1d2"$ relative to the normal 3P to the diffusion plate.

Light beam L13" is emitted with an intensity of $I0 \times \cos(\theta 13")$ and reflected by side surface B, whereby its intensity is reduced to $R \times I0 \times \cos(\theta 13")$. Thus, light beam L13" having an intensity of $R \times I0 \times \cos(\theta 13")$ reaches point c of the diffusion plate 3 with at angle $\theta 1d3"$ relative to the normal 3P to the diffusion plate. Light beam L14" is emitted with an intensity of $I0 \times \cos(\theta 14")$ and reflected by side surface A and side surface B, whereby its intensity is reduced to $R^2 \times I0 \times \cos(\theta 14")$. Thus, light beam L14" having an intensity of $R^2 \times I0 \times \cos(\theta 14")$ reaches point c of the diffusion plate 3 at angle $\theta 1d4"$ relative to the normal 3P to the diffusion plate. Combining these light beams, light $L_{\theta 1}c$ oriented to a direction at angle $\theta 1c$ is obtained.

Thus, the light passing through point c of the diffusion plate 3 generated by contributions of light beams emitted from the first light source 1a has the highest directivity in the direction at angle $\theta 1c$ relative to the normal 3P to the diffusion plate 3.

As to light beam L11" inclined to the right relative to the normal 3P to the diffusion plate 3, $\theta 1d1">\theta 1d1$ and $I0 \times \cos(\theta 11")<I0 \times \cos(\theta 11)$. Thus, the contribution of direct light beam L11" is larger in terms of angle but lower in terms of intensity as compared to the contribution of light beam 11 at the center a.

Similarly, as to light beam L12" inclined to the right relative to the normal 3P to the diffusion plate 3, $\theta 1d2">\theta 1d2$ and $I0 \times \cos(\theta 12")<I0 \times \cos(\theta 12)$. Thus, the contribution of light beam L12" is larger in terms of angle but lower in terms of intensity as compared to the contribution of light beam 12 at the center a.

On the other hand, as to light beam L13" inclined to the left relative to the normal 3P to the diffusion plate 3, $\theta 1d3"<\theta 1d3$ and $I0 \times \cos(\theta 13")>I0 \times \cos(\theta 13)$. Thus, the contribution of light beam L13" is smaller in terms of angle but higher in terms of intensity as compared to the contribution of light beam 13 at center point.

Similarly, as to light beam L14" inclined to the left relative to the normal 3P to the diffusion plate 3, $\theta 1d4"<\theta 1d4$ and $I0 \times \cos(\theta 14')>I0 \times \cos(\theta 14)$. Thus, the contribution of light beam L14" is smaller in terms of angle but higher in terms of intensity as compared to the contribution of light beam 14 at the center a.

Considering the light $L_{\theta 1}c$ which is obtained by the combination of the above light beams, there are only small differences in the angle $\theta 1c$, $\theta 1a$ and the intensity between combined light $L_{\theta 1}c$ and combined light $L_{\theta 1}a$.

Figure 5:
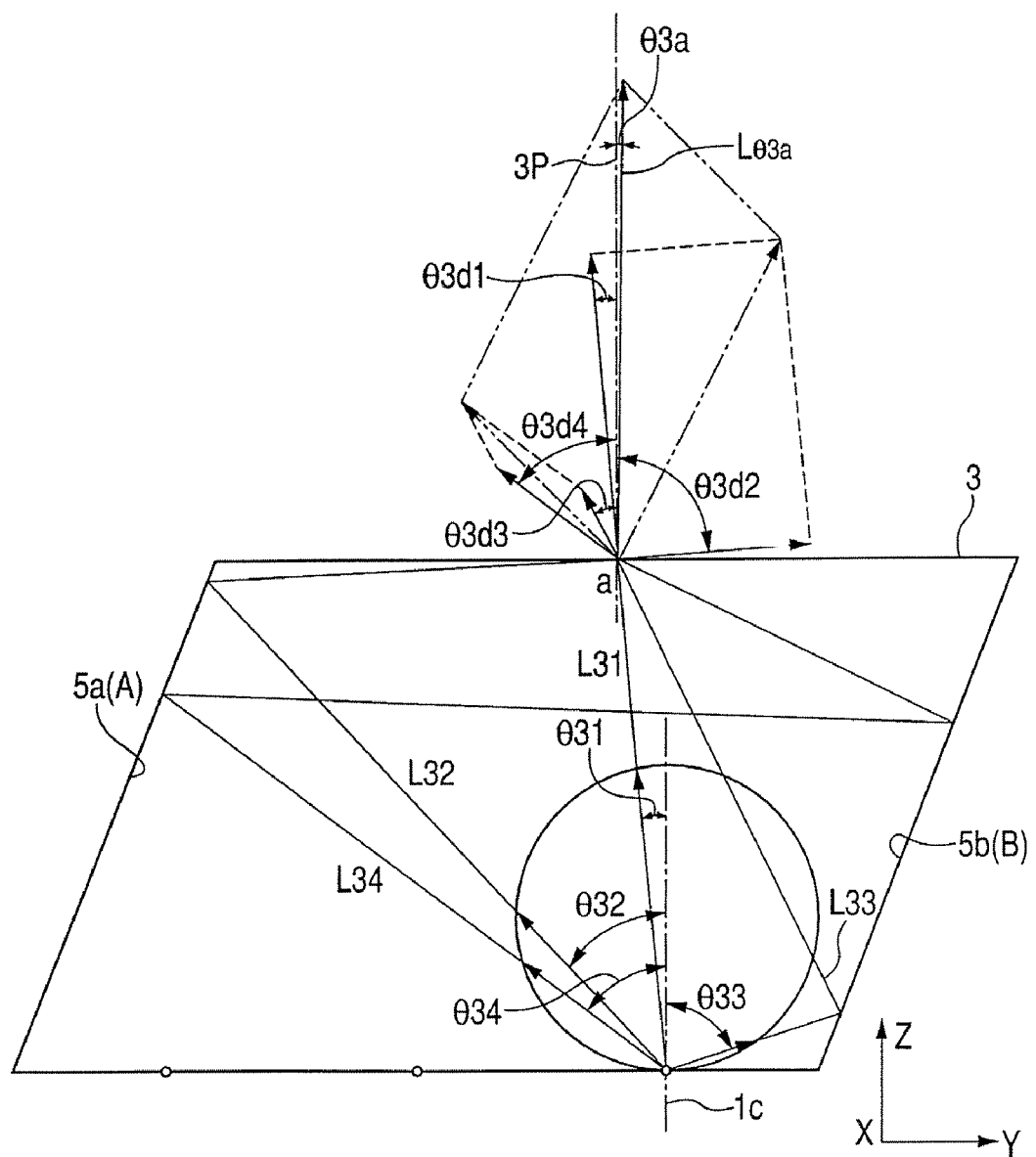
FIG. 5 illustrates optical paths of light beams that are emitted from one light source and incident on a point on the diffusion plate.

In the following, light beams that are emitted from the third light source 1c and reach the center a of the diffusion plate 3 will be described with reference to FIG. 5.

Similar to the case of the first light source 1a, the light beams that are emitted from the third light source 1c and reach the center a of the diffusion plate 3 include light beam L31 that reaches the diffusion plate 3 directly from the light source 1c, light beam L32 that reaches the diffusion plate 3 after reflected by one side A, light beam L33 that reaches the diffusion plate 3 after reflected by another side B, and light beam L34 that reaches the diffusion plate 3 after reflected by side A and then side B.

What is different in the case of the third light source 1c from the first light source 1a is that the light beam L31 that is incident directly on the diffusion plate 3 comes from the right side (+y side) of the center a of the diffusion plate, and therefore it enters the diffusion plate 3 as a light beam traveling to the left relative to the normal 3P to the diffusion plate.

Here, absorption and reflection on the diffusion plate 3 are ignored as is the case with the discussion on the first light source 1a. Light beam L31 has an intensity of $I0 \times \cos(\theta 31)$ and reaches the center a of the diffusion plate 3 at angle $\theta 3d1$ ($=\theta 31$) relative to the normal 3P to the diffusion plate 3.

Here, ignoring angle dependency of the reflectance of the reflective side surfaces A, B, the reflective side surfaces A, B are assumed to have a uniform reflectance R. Light beam L32 is emitted with an intensity of $I0 \times \cos(\theta 32)$ and reflected by side surface A, whereby its intensity is reduced to $R \times I0 \times \cos(\theta 32)$. Thus, light beam L32 having an intensity of $R \times I0 \times \cos(\theta 32)$ reaches the center a of the diffusion plate 3 at angle $\theta 3d2$ ($=\theta 32+2 \times \alpha$) relative to the normal 3P to the diffusion plate.

Light beam L33 is emitted with an intensity of $I0 \times \cos(\theta 33)$ and reflected by side surface B, whereby its intensity is reduced to $R \times I0 \times \cos(\theta 33)$. Thus, light beam L33 having an intensity of $R \times I0 \times \cos(\theta 33)$ reaches the center a of the diffusion plate 3 at angle $\theta 3d3$ ($=\pi/2-\theta 33$) relative to the normal 3P to the diffusion plate.

Light beam L34 is emitted with an intensity of $I0 \times \cos(\theta 34)$ and reflected by side surface A and then by side surface B, whereby its intensity is reduced to $R^2 \times I0 \times \cos(\theta 34)$. Thus, light beam L34 having an intensity of $R^2 \times I0 \times \cos(\theta 34)$ reaches the center a of the diffusion plate 3 at angle $\theta 3d4$ ($=\theta 34$) relative to the normal 3P to the diffusion plate.

Combining these light beams, light $L_{\theta 3}a$ oriented to a direction at angle $\theta 3a$ is obtained. Thus, the light passing through the center a of the diffusion plate 3 generated by contributions of light beams emitted from the third light source 1c has the highest directivity in the direction at angle $\theta 3a$ relative to the normal 3P to the diffusion plate 3.

The light beam L32 emitted from the third light source 1c has a larger inclination angle to the right relative to the normal 3P to the diffusion plate 3 and higher intensity in comparison with the light beam L12 emitted from the first light source 1a.

Thus, although the other light beams L31, L33 and L34 emitted from the third light source 1c are inclined to the left relative to the normal 3P to the diffusion plate 3, the combined light $L_{\theta 3}a$ has directivity in a direction slightly inclined to the right relative to the normal 3P to the diffusion plate 3.

Figure 6:
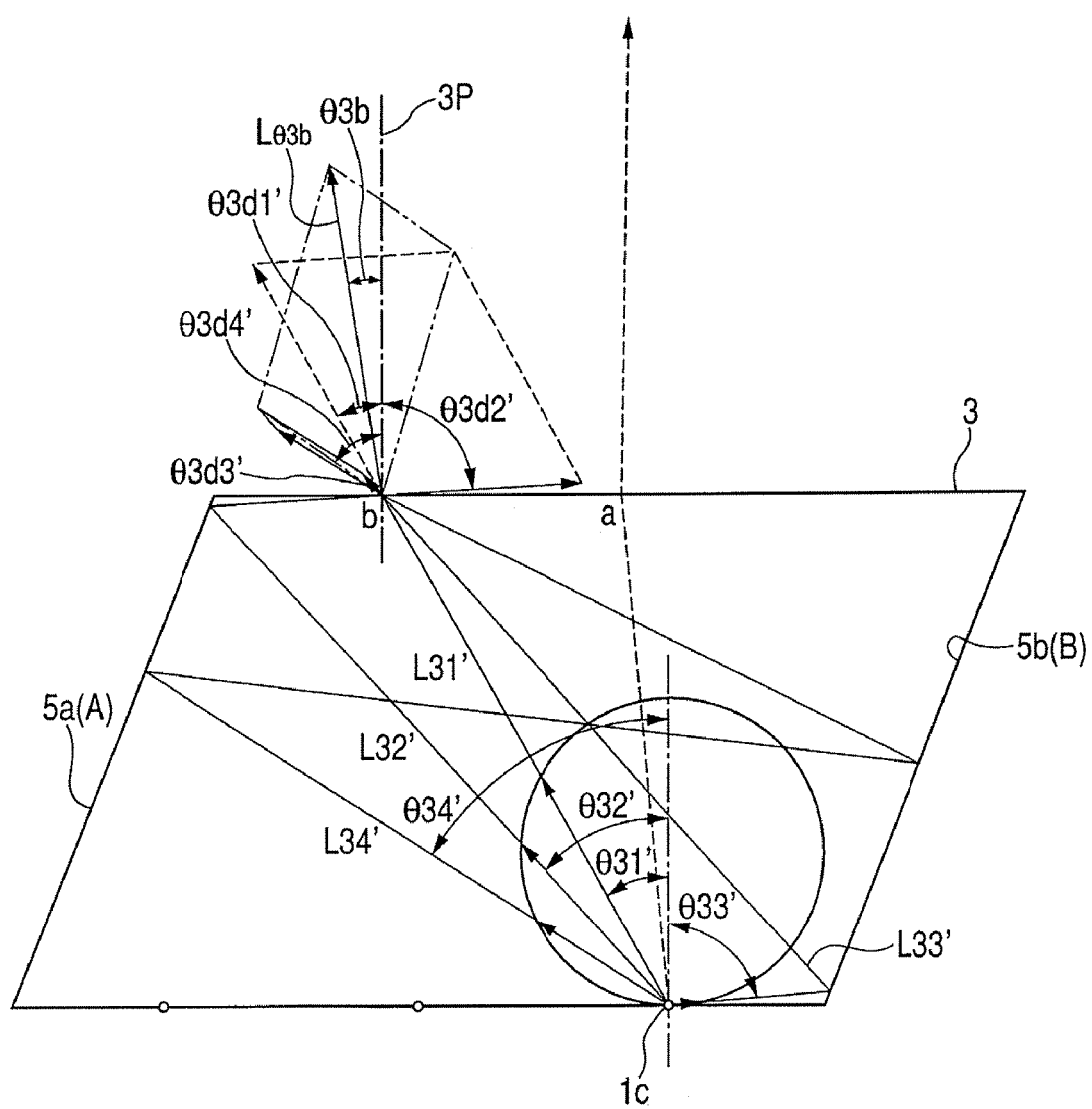
FIG. 6 illustrates optical paths of light beams that are emitted from one light source and incident on a point on the diffusion plate.

In the following, contributions of the light beams emitted from the third light source 1c at point b that is located on the left (i.e. −y side) of the center a of the diffusion plate 3 will be discussed with reference to FIG. 6.

Light beam L31' having an intensity of $I0 \times \cos(\theta 31')$ reaches point b of the diffusion plate 3 at angle $\theta 3d1'$ relative to the normal 3P to the diffusion plate.

Here, ignoring angle dependency of the reflectance of the reflective side surfaces A and B, the reflective side surfaces A, B are assumed to have a uniform reflectance R. Light beam L32' is emitted with an intensity of $I0 \times \cos(\theta 32')$ and reflected by side surface A, whereby its intensity is reduced to $R \times I0 \times \cos(\theta 32')$. Thus, light beam L32' having an intensity of $R \times I0 \times \cos(\theta 32')$ reaches point b of the diffusion plate 3 at angle $\theta 3d2'$ relative to the normal 3P to the diffusion plate.

Light beam L33' is emitted with an intensity of $I0 \times \cos(\theta 33')$ and reflected by side surface B, whereby its intensity is reduced to $R \times I0 \times \cos(\theta 33')$. Thus, light beam L33' having an intensity of $R \times I0 \times \cos(\theta 33')$ reaches point b of the diffusion plate 3 at angle $\theta 3d3'$ relative to the normal 3P to the diffusion plate. Light beam L34' is emitted with an intensity of $I0 \times \cos(\theta 34')$ and reflected by side surface A and then by side surface B, whereby its intensity is reduced to $R^2 \times I0 \times \cos(\theta 34')$. Thus, light beam L34' having an intensity of $R^2 \times I0 \times \cos(\theta 34')$ reaches point b of the diffusion plate 3 at angle $\theta 3d4'$ relative to the normal 3P to the diffusion plate.

Combining these light beams, light $L_{\theta 3}b$ oriented to a direction at angle $\theta_{3b}$ is obtained. Thus, the light passing through point b of the diffusion plate 3 generated by contributions of light beams emitted from the third light source 1c has the highest directivity in the direction at angle $\theta 3b$ relative to the normal 3P to the diffusion plate 3.

As to light beam L31' inclined to the left relative to the normal 3P to the diffusion plate 3, $\theta 3d1' \geqq \theta 3d1$ and $I0 \times \cos(\theta 31') \leqq I0 \times \cos(\theta 31)$. Thus, the contribution of light beam L31' is larger in terms of angle but lower in terms of intensity as compared to the contribution of light beam 31 at the center a.

Similarly, as to light beam L32' inclined to the right relative to the normal 3P to the diffusion plate 3, $\theta 3d2' > \theta 3d2$ and $I0 \times \cos(\theta 32') > I0 \times \cos(\theta 32)$. Thus, the contribution of light beam L32' is larger in terms of angle and higher in terms of intensity as compared to the contribution of light beam 32 at the center a.

On the other hand, as to light beam L33' inclined to the left relative to the normal 3P to the diffusion plate 3, $\theta 3d3' > \theta 3d3$ and $I0 \times \cos(\theta 33') < I0 \times \cos(\theta 33)$. Thus, the contribution of light beam L33' is larger in terms of angle but much lower in terms of intensity as compared to the contribution of light beam 33 at the center a.

Similarly, as to light beam L34' inclined to the left relative to the normal 3P to the diffusion plate 3, $\theta 3d4' \geqq \theta 3d4$ and $I0 \times \cos(\theta 34') < I0 \times \cos(\theta 34)$. Thus, the contribution of light beam L34' is a little larger in terms of angle but a little lower in terms of intensity as compared to the contribution of light beam 34 at the center a.

The light $L_{\theta 3}b$ which is obtained by the combination of these light beams travels in a direction slightly inclined to the left at angle $\theta 3b$ relative to the normal 3P to the diffusion plate 3. There is only a small difference between angle $\theta 3b$ and angle $\theta 3a$, and the intensity of light $L_{\theta 3}b$ is lower than the intensity of light $L_{\theta 3}a$.

Figure 7:
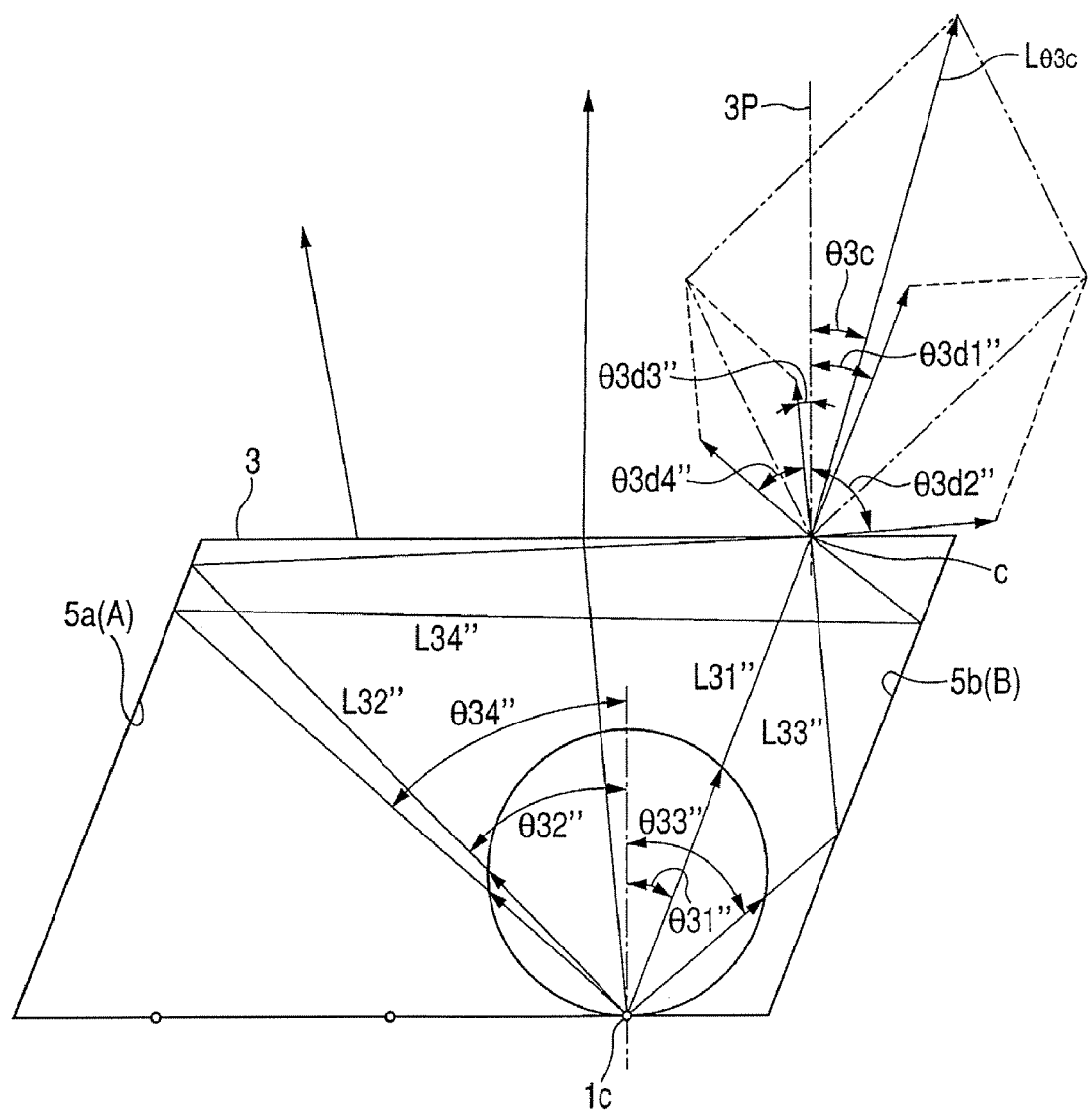
FIG. 7 illustrates optical paths of light beams that are emitted from one light source and incident on a point on the diffusion plate.

In the following, contributions of the light beams emitted from the third light source 1c at point c that is located on the right (i.e. +y side) of the center a of the diffusion plate 3 will be discussed with reference to FIG. 7.

Light beam L31" having an intensity of I0×cos(θ31") reaches point c of the diffusion plate 3 at angle θ3d1" relative to the normal 3P to the diffusion plate 3.

Here, ignoring angle dependency of the reflectance of the reflective side surfaces A and B, the side surfaces A and B are assumed to have a uniform reflectance R. Light beam L32" is emitted with an intensity of I0×cos(θ32") and reflected by side surface A, whereby its intensity is reduced to R×I0×cos(θ32"). Thus, light beam L32" having an intensity of R×I0×cos(θ32") reaches point c of the diffusion plate 3 at angle θ3d2" relative to the normal 3P to the diffusion plate 3.

Light beam L33" is emitted with an intensity of I0×cos(θ33") and reflected by side surface B, whereby its intensity is reduced to R×I0×cos(θ33×). Thus, light beam L33" having an intensity of R×I0×cos(×33") reaches point c of the diffusion plate 3 with at angle θ3d3" relative to the normal 3P to the diffusion plate 3. Light beam L34" is emitted with an intensity of I0×cos(θ34") and reflected by side surface A and then by side surface B, whereby its intensity is reduced to $R^2$×I0×cos(θ34"). Thus, light beam L34" having an intensity of $R^2$×I0×cos(θ34") reaches point c of the diffusion plate 3 at angle θ3d4" relative to the normal 3P to the diffusion plate 3.

The light $L_{\theta3}c$ which is obtained by the combination of these light beams is oriented to a direction at angle θ3c. Thus, the light passing through point c of the diffusion plate 3 generated by contributions of light beams emitted from the third light source 1c has the highest directivity in the direction at angle θ3c relative to the normal 3P to the diffusion plate 3.

Here, it is significant that light beam L31" is changed to be inclined to the right rather than to the left with respect to the normal to the diffusion plate 3 in comparison to the case that the beam travels toward the point a.

It is significant that the angle θ31" of light beam L31" traveling to the right relative to the normal 3P to the diffusion plate 3 is inclined to the right contrary to angle θ31, which is inclined to the left. The contribution of light beam L31 is high in terms of intensity as compared to the contribution of light beam L31", but nearly zero in terms of angle.

Similarly, the contribution of light beam L32" inclined to the right relative to the normal 3P to the diffusion plate 3 is a little smaller in terms of angle but lower in terms of intensity as compared to the contribution of light beam L32 at the center a. Thus, the contribution of light beam L32" is substantially the same.

In contrast, the contribution of light beam L33" inclined to the left relative to the normal 3P to the diffusion plate 3 is higher in terms of intensity but smaller in terms of angle as compared to the contribution of light beam L33 at the center a.

Similarly, the contribution of light beam L34" inclined to the left relative to the normal 3P to the diffusion plate a is higher in terms of intensity but much smaller in terms of angle as compared to the contribution of light beam L34 at the center a.

Considering the combination of these beams, angle θ3c (in FIG. 7) is more greatly inclined to the right than angle θ3a (in FIG. 5), and the intensity of the combined light at point c is higher than that at point a.

Figure 8:
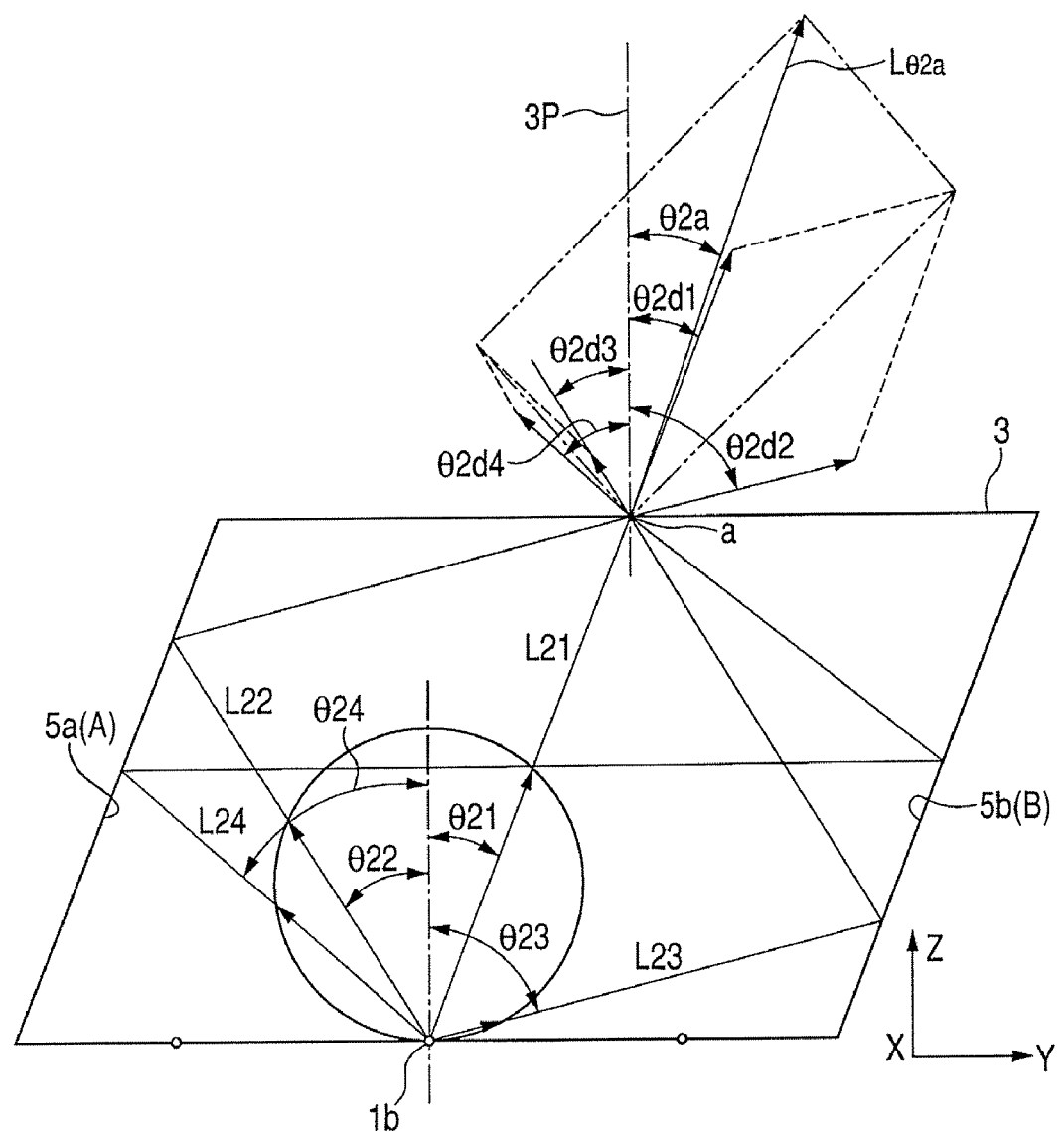
FIG. 8 illustrates optical paths of light beams that are emitted from one light source and incident on a point on the diffusion plate.

In the following, light beams emitted from the second light source 1b located between the first light source 1a and the third light source 1c and reach the center a of the diffusion plate 3 will be described with reference to FIG. 8.

Similar to the case of the first light source 1a, the light beams emitted from the second light source 1b and reach the center a of the diffusion plate 3 include light beam L21 that reaches the diffusion plate 3 directly from the light source 1b, light beam L22 that reaches the diffusion plate 3 after reflected by one side A, light beam L23 that reaches the diffusion plate 3 after reflected by another side B, and light beam L24 that reaches the diffusion plate 3 after reflected by side A and then by side B.

Here, absorption, reflection and scattering on the diffusion plate 3 are ignored as is the case with the discussion on the first light source 1a. Light beam L21 has an intensity of I0×cos(θ21) and reaches the center a of the diffusion plate 3 at angle θ2d1 (=θ21) relative to the normal 3P to the diffusion plate 3.

Here, ignoring angle dependency of the reflectance of the reflective side surfaces A, B, the reflective side surfaces A, B are assumed to have a uniform reflectance R. Light beam L22 is emitted with an intensity of I0×cos(θ22) and reflected by side surface A, whereby its intensity is reduced to R×I0×cos(θ22). Thus, light beam L22 having an intensity of R×I0×cos(θ22) reaches the center a of the diffusion plate 3 at angle θ2d2 (=θ22+233 α) relative to the normal 3P to the diffusion plate 3.

Light beam L23 is emitted with an intensity of I0×cos(θ23) and reflected by side surface B, whereby its intensity is reduced to R×I0×cos(θ23). Thus, light beam L23 having an intensity of R×I0×cos(θ23) reaches the center a of the diffusion plate 3 at angle θ2d3 (=π/2−θ23) relative to the normal 3P to the diffusion plate 3.

Light beam L24 is emitted with an intensity of I0×cos(θ24) and reflected by side surface A and then by side surface B, whereby its intensity is reduced to $R^2$×I0×cos(θ24). Thus, light beam L24 having an intensity of $R^2$×I0×cos(θ24) reaches the center a of the diffusion plate 3 at angle θ2d4 (=θ24) relative to the normal 3P to the diffusion plate 3.

The light $L_{\theta2}a$ which is obtained by the combination of these light beams is oriented to a direction at angle θ2a. Thus, the light passing through the center a of the diffusion plate 3 generated by contributions of light beams emitted from the second light source 1b has the highest directivity in the direction at angle θ2a relative to the normal 3P to the diffusion plate 3.

Figure 9:
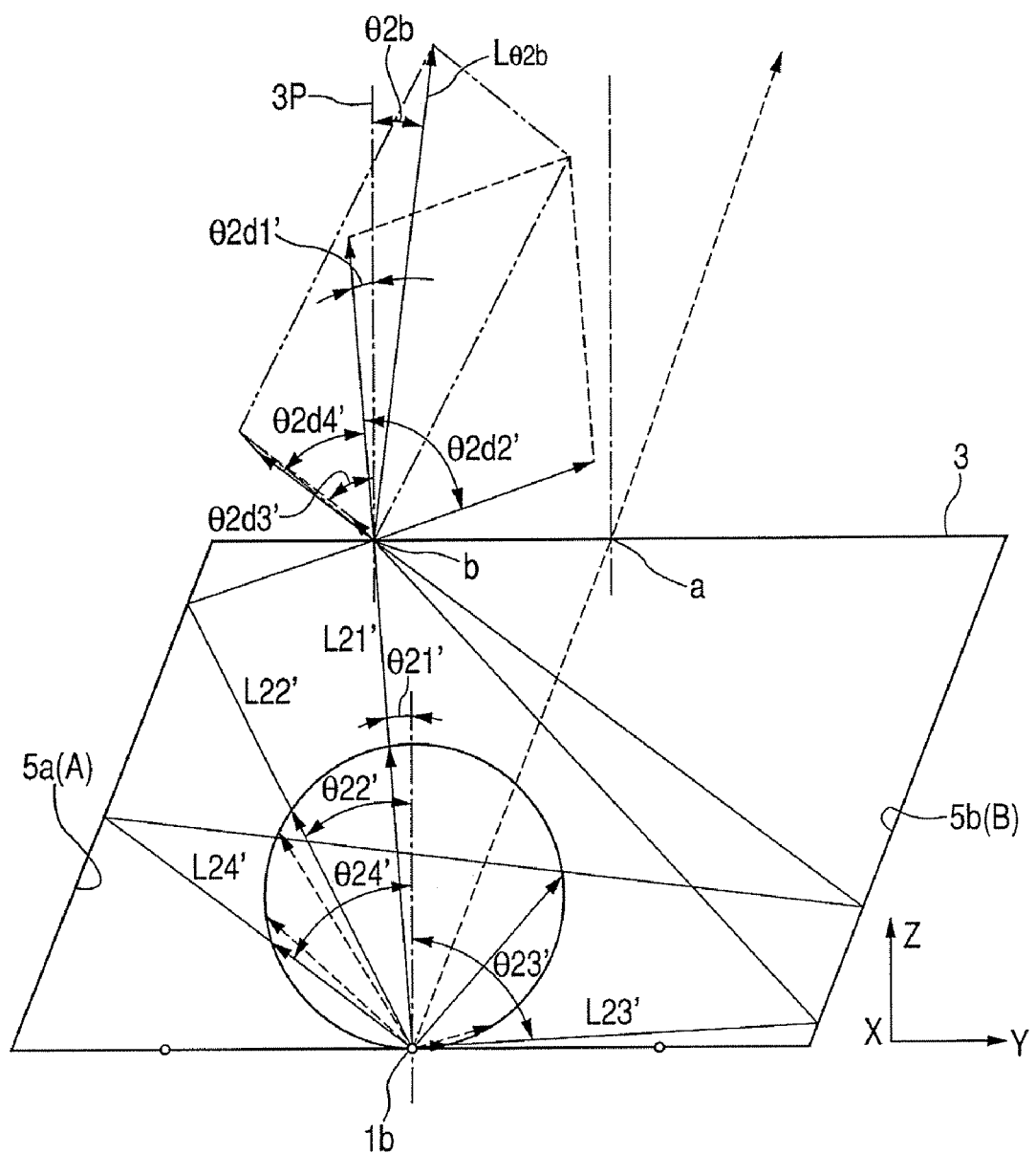
FIG. 9 illustrates optical paths of light beams that are emitted from one light source and incident on a point on the diffusion plate.

In the following, contributions of the light beams emitted from the second light source 1b at point b that is located on the left (i.e. −y side) of the center a of the diffusion plate 3 will be discussed with reference to FIG. 9.

Light beam L21' having an intensity of I0×cos(θ21') reaches point b of the diffusion plate 3 at angle θ2d1' relative to the normal 3P to the diffusion plate.

Here, ignoring angle dependency of the reflectance of the reflective side surfaces A and B, the reflective side surfaces A, B are assumed to have a uniform reflectance R. Light beam L22' is emitted with an intensity of I0×cos(θ22') and reflected by side surface A, whereby its intensity is reduced to R×I0×cos(θ22'). Thus, light beam L22' having an intensity of R×I0×cos(θ22') reaches point b of the diffusion plate 3 at angle θ2d2' relative to the normal 3P to the diffusion plate 3.

Light beam L23' is emitted with an intensity of I0×cos(θ23') and reflected by side surface B, whereby its intensity is reduced to R×I0×cos(θ23'). Thus, light beam L23' having an intensity of R×I0×cos(θ23') reaches point b of the diffusion plate 3 at angle θ2d3' relative to the normal 3P to the diffusion plate 3.

Light beam L24' is emitted with an intensity of I0×cos(θ24') and reflected by side surface A and then by side surface B, whereby its intensity is reduced to $R^2$×I0×cos(θ24'). Thus, light beam L24' having an intensity of $R^2$×I0×cos(θ24') reaches point b of the diffusion plate 3 at angle θ2d4' relative to the normal 3P to the diffusion plate 3.

The light $L_{\theta2}b$ which is obtained by the combination of these light beams is oriented to a direction at angle θ2b. Thus, the light passing through point b of the diffusion plate 3 generated by contributions of light beams emitted from the second light source 1b has the highest directivity in the direction at angle θ2b relative to the normal 3P to the diffusion plate 3.

Light beam L21' is inclined to the left relative to the normal 3P to the diffusion plate 3, contrary to light beam L21 traveling to the center a of the diffusion plate 3. The contribution of light beam L21' is higher in terms of intensity, but smaller in terms of the absolute value of angle as compared to the contribution of light beam L21 at the center a.

Similarly, as to light beam L22' inclined to the right relative to the normal 3P to the diffusion plate 3, I0×cos(θ22')>I0×cos(θ22). Thus, the direct contribution of light beam L22' has no significant difference in terms of angle but is higher in terms of intensity as compared to the contribution of light beam 22 at the center a.

On the other hand, as to light beam L23' inclined to the left relative to the normal 3P to the diffusion plate 3, θ2d3'>θ2d3 and I0×cos(θ23')<I0×cos(θ23). Thus, the contribution of light beam L23' is larger in terms of angle but much lower in terms of intensity as compared to the contribution of light beam 23 at the center a.

Similarly, as to light beam L24' inclined to the left relative to the normal 3P to the diffusion plate 3, θ2d4'≧θ2d4 and I0×cos(θ24')<I0×cos(θ24). Thus, the contribution of light beam L24' is a little larger in terms of angle but a little lower in terms of intensity as compared to the contribution of light beam 24 at the center a.

Considering the combination of these light beams, angle θ2b is formed on the right of the normal 3P to the diffusion plate 3, and the difference between angle θ2b and angle θ2a is small. The difference between the intensity of the combined light at point b and that at point a is also small.

Figure 10:
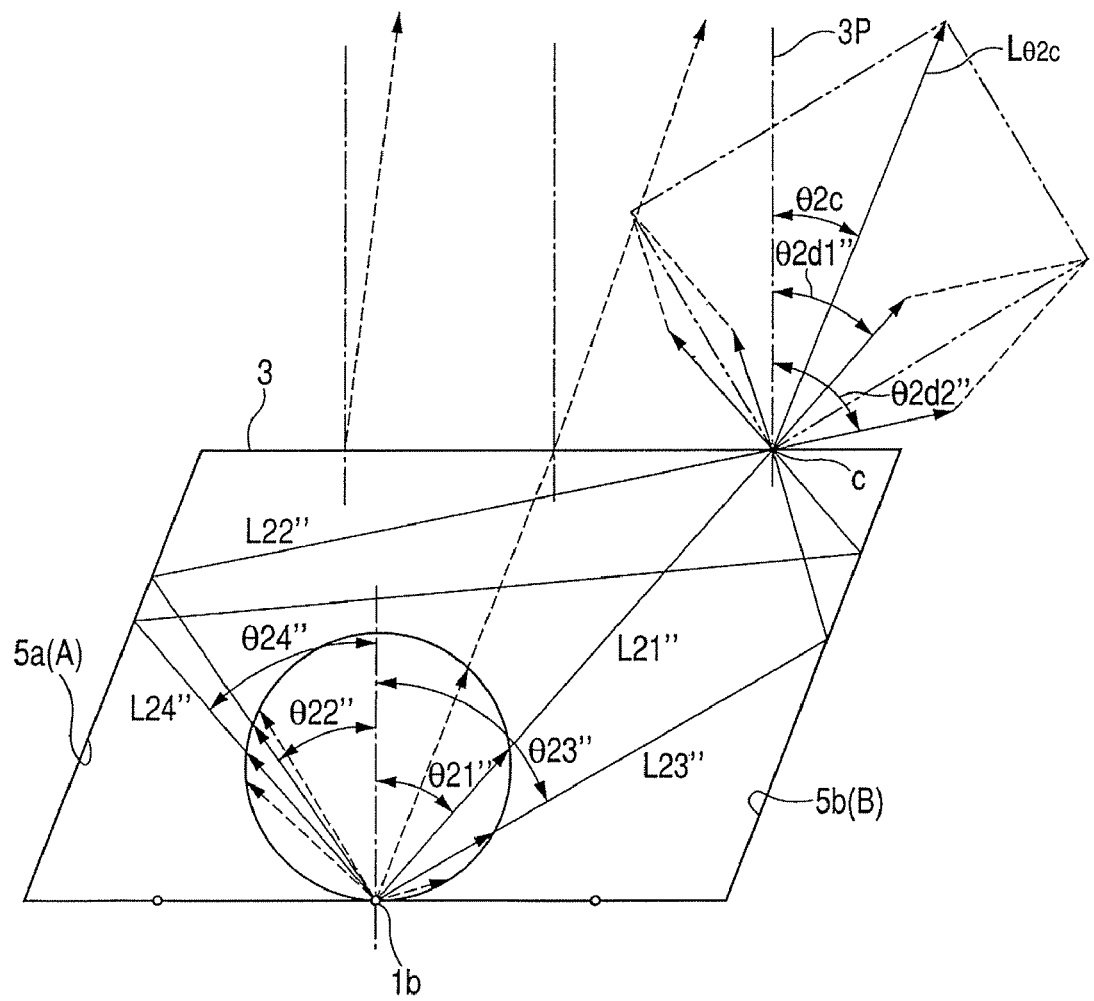
FIG. 10 illustrates optical paths of light beams that are emitted from one light source and incident on a point on the diffusion plate.

In the following, contributions of the light beams emitted from the second light source 1b at point c that is located on the right (i.e. +y side) of the center a of the diffusion plate 3 will be discussed with reference to FIG. 10.

Light beam L21" having an intensity of I0×cos(θ21") reaches point c of the diffusion plate 3 at angle θ2d1" relative to the normal 3P to the diffusion plate.

Here, ignoring angle dependency of the reflectance of the reflective side surfaces A and B, the side surfaces A and B are assumed to have a uniform reflectance R. Light beam L22" is emitted with an intensity of I0×cos(θ22") and reflected by side surface A, whereby its intensity is reduced to R×I0×cos(θ22"). Thus, light beam L22" having an intensity of R×I0×cos(θ22") reaches point c of the diffusion plate 3 at angle θ2d2" relative to the normal 3P to the diffusion plate 3.

Light beam L23" is emitted with an intensity of I0×cos(θ23") and reflected by side surface B, whereby its intensity is reduced to R×I0×cos(θ23"). Thus, light beam L23" having an intensity of R×I0×cos(θ23") reaches point c of the diffusion plate 3 with at angle θ2d3" relative to the normal 3P to the diffusion plate 3.

Light beam L24" is emitted with an intensity of I0×cos(θ24") and reflected by side surface A and then by side surface B, whereby its intensity is reduced to $R^2$×I0×cos(θ24"). Thus, light beam L24" having an intensity of $R^2$×I0×cos(θ24") reaches point c of the diffusion plate 3 at angle θ2d4" relative to the normal 3P to the diffusion plate 3.

The light $L_{θ2}c$ which is obtained by the combination of these light beams is oriented to a direction at angle θ2c. Thus, the light passing through point c of the diffusion plate 3 generated by contributions of light beams emitted from the second light source 1b has the highest directivity in the direction at angle θ2c relative to the normal 3P to the diffusion plate 3.

Here, it is significant that light beam L21" is inclined to the right rather than to the left with respect to the normal 3P to the diffusion plate 3 in comparison to the case that the light beam traveling toward the center a of the diffusion plate 3.

The contribution of light beam L21" inclined to the right relative to the normal 3P to the diffusion plate 3 is lower in terms of intensity but larger in terms angle as compared to the contribution of light beam L21 at the center a.

Similarly, the contribution of light beam L22" inclined to the right relative to the normal 3P to the diffusion plate 3 is a little larger in terms of angle but lower in terms of intensity as compared to the contribution of light beam L22 at the center a. However, there is substantially no difference.

In contrast, the contribution of light beam L23" inclined to the left relative to the normal 3P to the diffusion plate is higher in terms of intensity but smaller in terms of angle as compared to the contribution of light beam L23 at the center a.

Similarly, the contribution of light beam L24" inclined to the left relative to the normal 3P to the diffusion plate is higher in terms of intensity but much smaller in terms of angle as compared to the contribution of light beam L24 at the center a.

Considering the combination of these light beams, there is only a small difference between angle θ2c and angle θ2a, and there is only a small difference in the intensity of the combined light at point c and that at point a.

Figure 11:
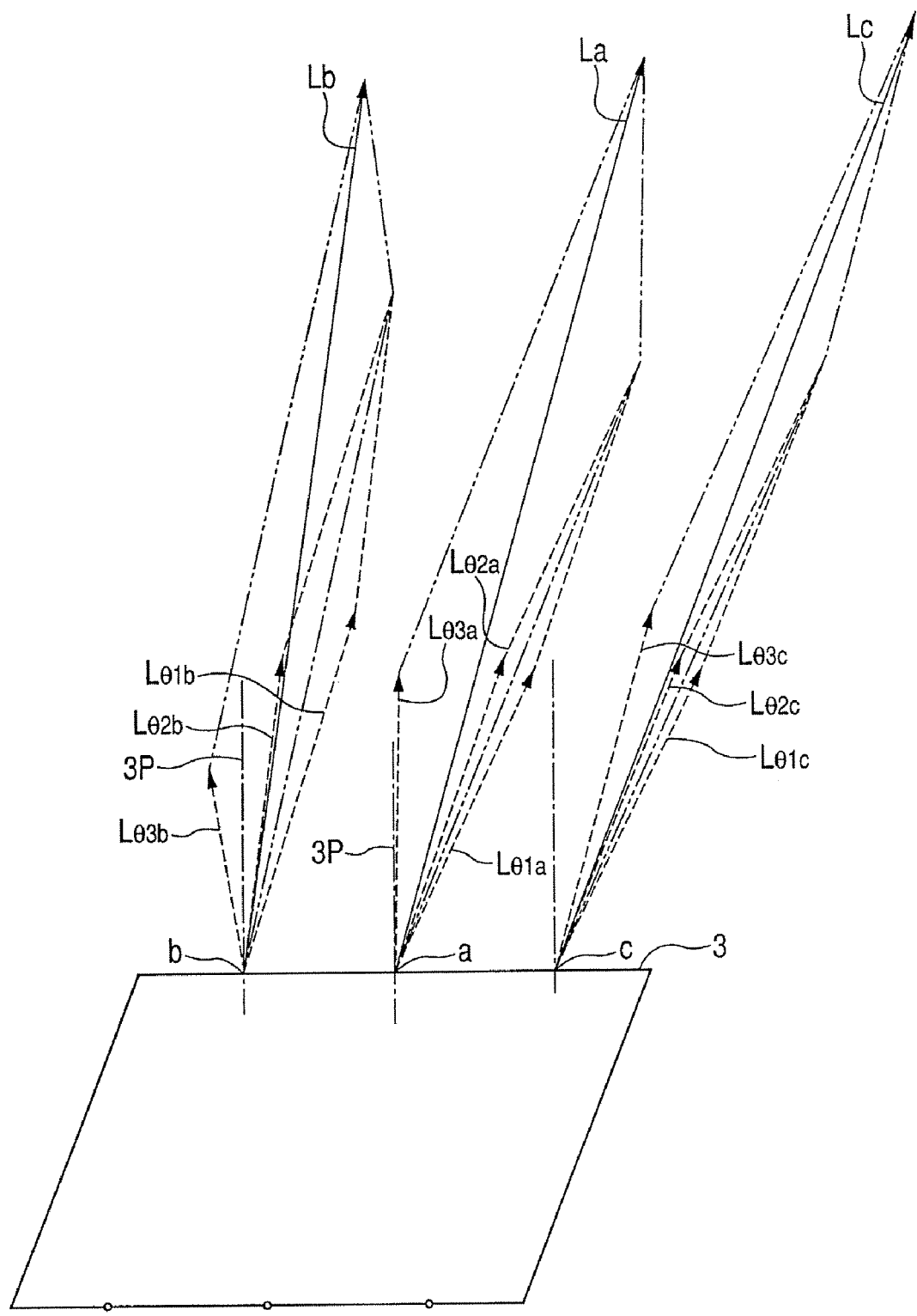
FIG. 11 illustrates directivity of light beams on the diffusion plate generated by light beams emitted from the light sources shown in FIG. 1.

FIG. 11 shows the combined overall directivity of the light source apparatus according to this embodiment obtained by the combination of the light beams emitted from the three light sources 1a, 1b, and 1c at the respective points.

By summing up contributions of the light beams from the respective light sources 1a, 1b, 1c at respective points a, b, c based on FIGS. 2A to 11, directivity as represented by solid arrows La, Lb, Lc is obtained.

As will be seen from FIG. 11, although the inclination angle to the right relative to the normal 3P to the diffusion plate and the intensity decrease a little as shifting toward the left (i.e. the angle and intensity are the largest/highest at point c and the smallest/lowest at point b), a light source that has the peak of the directivity characteristic in a direction generally inclined to the right can be provided.

Although the embodiment described in the foregoing has three light sources on the illustrated cross section, the number of the light sources (or the number of the rows of the light sources) may be increased.

When the number (or the number of the rows of) the light sources is increased, the height and angle of the reflection surface 5a on the side wall of the frame 4 that is inclined toward the light source 1 are to be designed appropriately to restrict the number.

Specifically, the light sources are arranged in such a way that the number of the light sources whose mirror images with respect to the reflection surface 5a inclined toward the light source substrate 2 are formed at positions on the light source substrate 2 side of the diffusion surface (i.e. the secondary light source surface) 3a of the diffusion plate 3 is larger than n/2, that is, half the number n of the (rows of) light sources. With this condition, the directivity of the light source apparatus can be inclined effectively relative to the normal 3P to the diffusion plate.

Figure 14:
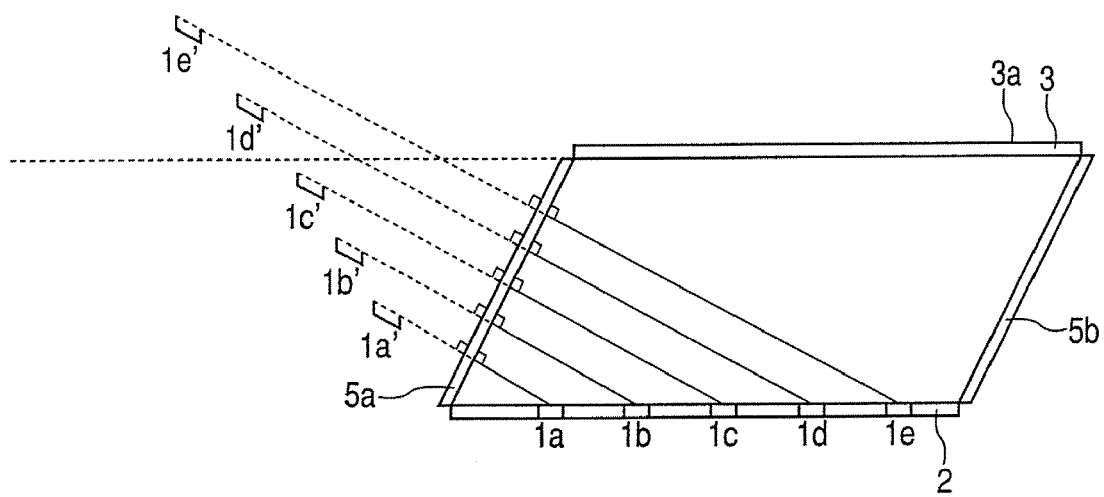
FIG. 14 illustrates a part of FIG. 1.

In the case illustrated in FIG. 14, the number n of the light sources is five (n=5), and the three light sources 1a, 1b, 1c among them have mirror images 1a', 1b', 1c' on the light source substrate 2 side of the diffusion surface (or the surface light source) 3a of the diffusion plate 3.

The inclination angles of the left and right side surfaces may differ from each other. When the angles of the side surfaces are different, the intensity of the light beams reflected by side surface B toward the direction opposite to the direction to which the directivity is to be inclined relative to the normal of the diffusion plate and the intensity of the light beams reflected by side surface A toward the direction to which the directivity is to be inclined relative to the normal of the diffusion plate may be controlled independently from each other.

The side surfaces may be reflective diffusion plates rather than reflection surfaces.

The light sources used in the light source apparatus may be fluorescent tubes instead of LEDs.

According to the above described embodiment, the apparatus can provide bright illumination without significant unevenness in spite of its simple structure, and its directivity can be easily inclined to an appropriate direction relative to the normal of the light emission surface of the light source surface.

Figure 12:
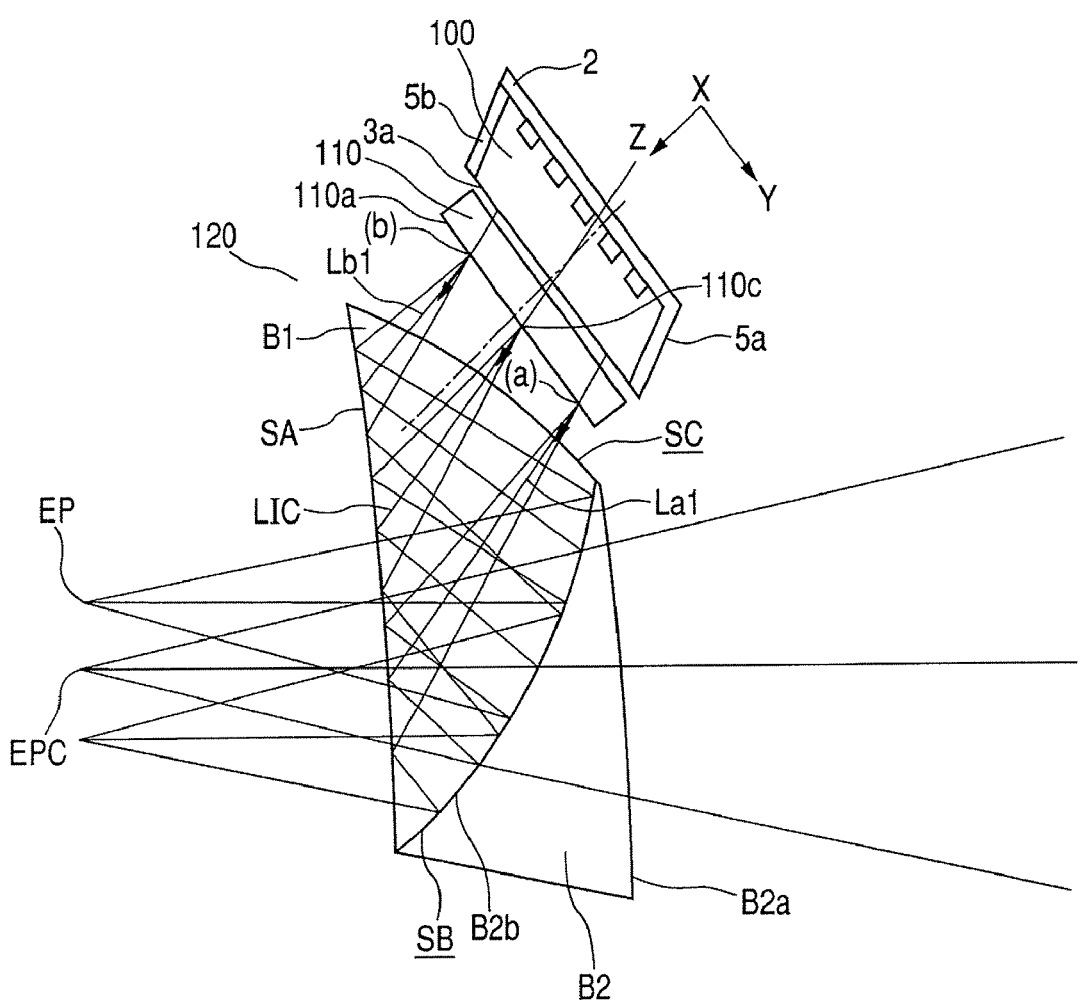
FIG. 12 is a schematic illustration of the relevant portions of an image display apparatus using a light source apparatus according to the present invention according to a second embodiment.

FIG. 12 schematically illustrates the relevant portions of an image display apparatus using a light source apparatus according to a second embodiment of the present invention.

The image display apparatus shown in FIG. 12 has a light source apparatus 100 according to the present invention, image display means 110 in the form of a transmission type liquid crystal display element (LCD), and an optical system 120. The image display means 110 is adapted to optically modulate light beams incident thereon based on image information and emit them. The optical system 120 enlarges the image generated by the image display means 110 to display it.

The optical system 120 has a prism B1 having a reflective curved surface that is decentered on the cross section of FIG. 12 and rotationally asymmetrical and a prism B2 having a rotationally-asymmetrical, transmissive curved surface. The prism B1 has an optical function of enlarging the image that the image display means 110 generates by modulating light from the light source apparatus 100 and presenting it to a pupil EP of the observer.

The prism 32 has a transmissive curved surface B2a and a semi-transmissive curved surface B2b. The prism B2 is cemented to the prism B1. Light beams representing information of an image of the external world come to the position of the pupil EP of the observer through curved surface B2a, semi-transmissive curved surface B2b and curved surface SA.

The observer observes image information generated by image display element 110 and image information of the external world that are spatially superimposed through the optical system 120.

The prism B1 has curved surfaces SA, SB and SC, which enclose a medium having a refractive index larger than 1. Curved surface SB is a semi-transmissive surface having the largest power (refractive power) among the surfaces in this embodiment.

The optical path length between curved surface SB and curved surface SC is longer for the lower field angle ray that emerges from (a) than for the upper field angle ray that emerges from (b). In contrast, the distance between surface SC and the image display surface 110a of the image display means 110 is longer for the upper field angle ray conversely. Thus, the chief rays La1, Lb1 are inclined relative to the image display surface 110a as illustrated in FIG. 12.

In view of this, use is made of the above described light source apparatus 100 having directivity arranged to be maximum in brightness in the direction of the chief rays to illuminate the image display surface 110, though the structure of the light source apparatus 100 is simple. Thus, bright illumination with high illumination efficiency is achieved.

In this embodiment, the ray that emerges from the center 100c of the image display element 100 and enters the center of pupil EP of the observer will be referred to as the center field angle chief ray LIC of the optical system 120, as indicated in FIG. 12.

In the image display apparatus according to this embodiment, the side surfaces 5a, 5b of the frame of the light source apparatus 100 is inclined relative to the plane (YZ plane) containing the center field angle chief ray LIC of the optical system 120.

In other words, the reflection surfaces 5a, 5b are arranged to be inclined relative to the normal to the image display element 110. In addition, the center field angle chief ray LIC is not parallel to the normal to the secondary light source surface 3a.

In this embodiment, the prism B2 is provided to correct distortion of image information of the external world, and its surface SB is designed to be a half mirror to enable optical see-through viewing. This is effective in this type of image display apparatus, particularly when it is used in the bright external environment like in the outdoor, where bright image presentation by the image display element 110 is required.

Not providing the second prism B2 in the apparatus according to this embodiment and providing a reflection surface as surface SB, only the image generated by the image display element 110 may be to be observed.

According to this embodiment, thanks to the use of the light source apparatus according to the embodiment described above, a high quality image display apparatus having high illuminance in the front direction with a small light source apparatus and a small optical system can be provided.

Figure 13:
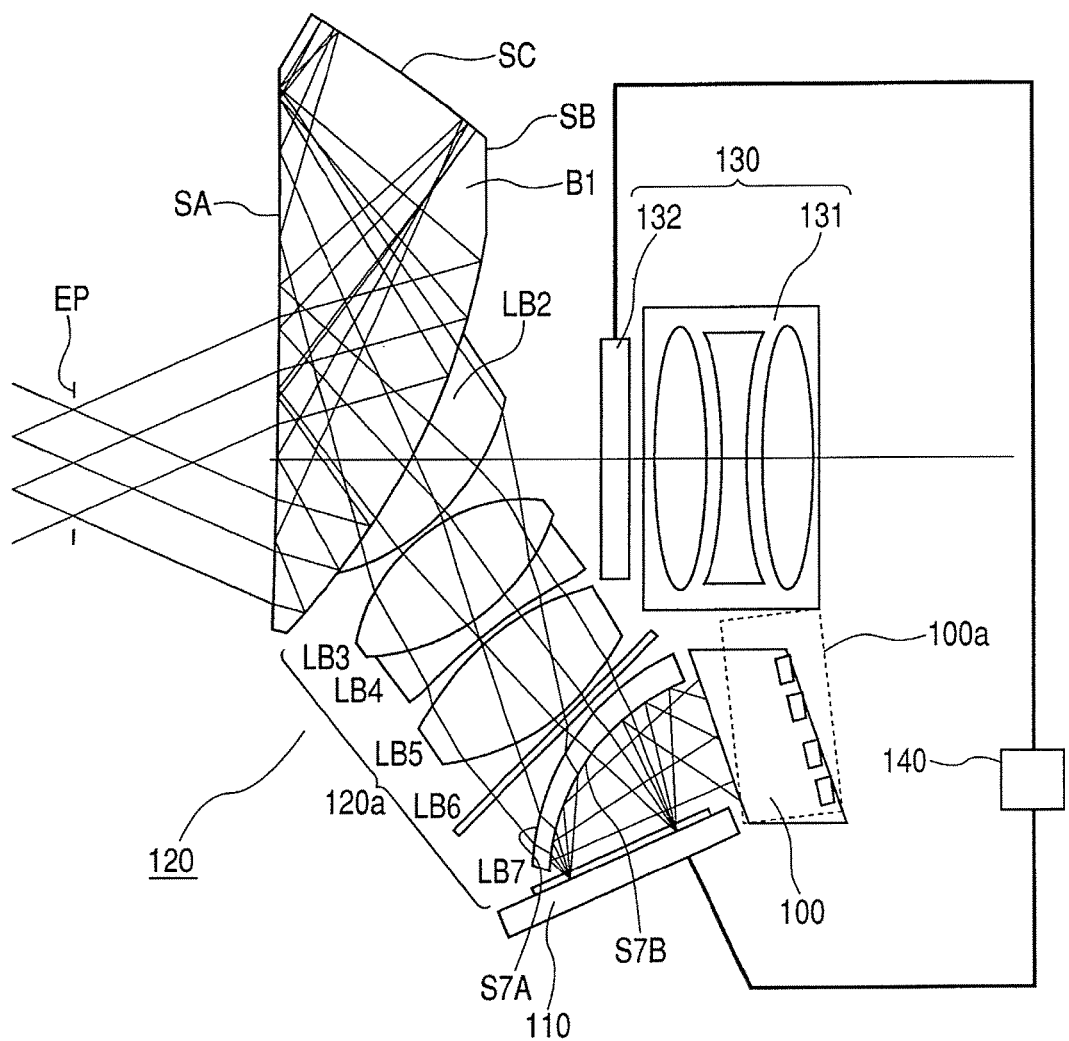
FIG. 13 is a schematic illustration of the relevant portions of an image display apparatus using a light source apparatus according to the present invention according to a third embodiment.

FIG. 13 schematically shows the relevant portions of an image display apparatus using a light source apparatus according to a third embodiment of the present invention. The image display apparatus has a light source apparatus 100 according to the present invention, image display element 110 in the form of a reflection type liquid crystal display element (LCD), an optical system 120 that enlarges the image generated by the image display element 110 for display and an image pickup system 130. The image pickup system 130 includes an image pickup lens 131 and an image pickup element 132 that photo-electrically converts information of the external world formed by the image pickup lens 131. Image information obtained by the image pickup element 132 is processed by image processing means 140, and an image is displayed on the image display element 110.

The optical system 120 has a prism B1 having a rotationally asymmetrical reflective curved surface that is decentered in the cross section of FIG. 13 and an imaging unit 120a including a decentered, rotationally-asymmetrical, transmissive curved surface, to constitutes a decentered optical system. The imaging unit 120a has lenses LB2 to LB7.

The optical system 120 has an optical function of enlarging the image that the image display means 110 generates by modulating light from the light source apparatus 100 and presenting it to a pupil EP of the observer.

The center field angle chief ray that enters the pupil EP and the optical axis of the image pickup lens 131 are in alignment with each other.

What is different in this embodiment from the second embodiment illustrated in FIG. 12 is that the image display means 110 is a reflective type image display element, the optical system 120 is a once-imaging optical system having forward and backward paths and having an illumination optical system, and the image display apparatus has the image pickup apparatus 130 that enables video-see-through.

The prism B1 has a rotationally asymmetrical reflective curved surface.

The prism B1 in this embodiment has curved surfaces SA, SB and SC, which enclose a medium having a refractive index larger than 1. The prism B1 is cemented with a lens LB2 through its surface SB. The surface SB serves as a half mirror to form forward and backward optical paths in the interior of the prism B1.

The prism B1, Lens LB2 and other lenses LB3 to LB7 have an optical function of forming an intermediate image of the image displayed on the image display element 110 in the interior of the prism B1 to present it as an enlarged virtual image to the pupil EP of the observer.

Lens LB7 constitutes an illumination optical system. A surface S7B of lens LB7 is a half mirror, which directs illumination light from the light source apparatus 100 to the reflection type image display means 110 and serves also as the first surface in guiding reflected light (display light) from the image display means 110 toward the observer.

This optical system 120 is relatively small in size and capable of presenting display by the image display element 110 at a high magnification (or large field angle). However, very bright light source apparatus is needed, since light is transmitted and reflected by the two half mirrors S7B and SB.

When a decentered optical system is used as the optical system 120, as is the case with the illustrated embodiment, the asymmetry of the optical system 120 is likely to leads to asymmetry in illumination light. It would be possible to eliminate such asymmetry in illumination light by appropriately designing the illumination optical system LB7. But such a countermeasure requires additional elements and invites an increase in the size of the optical system.

It would also be possible to eliminate asymmetry in illumination light by appropriately designing surface S7B. However, this will make the shape of that surface S7B complex, lead to a structure that is undesirable in correcting aberrations of display light and invite an increase in the size of the optical system due to addition of elements to the display system.

In the apparatus illustrated in FIG. 13, if the light source apparatus 100 according to the present invention is replaced by a light source apparatus 100a in which the side walls of the frame supporting the light source substrate and the secondary light source surface are not inclined to the same direction in a cross section but perpendicular to the light source substrate and the secondary light source surface, the light source apparatus 100a may interfere with the image pickup system 130 as shown by broken lines.

In contrast, when the light source apparatus 100 according to the present invention is used, a large quantity of light can be supplied without interference with the image pickup system 130 thanks to its small thickness, in spite of its simple structure.

The arrangement of the components shown in FIG. 13 allows to change the directivity so that brightest illumination is obtained in the direction of chief ray without making the size of the light emission surface large. Thus, an image display apparatus having a bright light source apparatus that has high illumination efficiency can be provided. In addition, freedom of design of the display optical system can be increased to enable to provide a small display system having a wide angle of field, and a light source apparatus that is small in thickness and entire size can be provided.

The above arrangement ensures clearance between the light source apparatus and the image pickup system 130 and enables to produce a small size video-see-through HMD easily.

By using LED chips each having light emitting elements of three primary colors R, G, B, the light source apparatus according to the embodiment can be used to perform color sequential display. In this case, many LEDs are provided, and fast blinking of bright illumination can be performed. Thus, a light source apparatus having high illumination efficiency can be provided.

According to the present invention there can be provided a light source apparatus whose directivity can be directed to an appropriate direction relative to the normal of the light emission surface of the light source and that can provide bright illumination without significant unevenness in spite of its simple structure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-146436, filed May 26, 2006, which is hereby incorporated by reference herein in its entirety.

What is claimed is:

1. An image display apparatus, comprising:
   a light source apparatus including a light source substrate on which a plurality of light sources is arranged, a secondary light source member on which a secondary light source surface is formed when the secondary light source member receives light from the plurality of light sources, and a frame with one end attached to the periphery of the light source substrate and the opposite end attached to the periphery of the secondary light source member so that the light source substrate and the secondary light source member are situated a predetermined distance opposite to each other, wherein the frame has at least one pair of opposing reflective surfaces, and each individual surface comprising the pair of opposing reflective surfaces is inclined in the same direction and at a predetermined angle relative to the normal to the light source substrate;
   an image display element that optically modulates a light beam from the light source apparatus and emits said light beam; and
   an optical system having a decentered reflective curved surface, the optical system guiding the light beam modulated by the image display element to an observer.

2. An image display apparatus according to claim 1, wherein each of the reflection surfaces that the pair of side surfaces of the light source apparatus has is arranged to be inclined relative to a normal to the image display element.

* * * * *